US011738712B2

(12) United States Patent
Desaki et al.

(10) Patent No.: US 11,738,712 B2
(45) Date of Patent: Aug. 29, 2023

(54) SEAT BELT ATTACHMENT/DETACHMENT DETECTION SWITCH

(71) Applicant: HOSIDEN CORPORATION, Osaka (JP)

(72) Inventors: Kenjiro Desaki, Osaka (JP); Takahide Kawanishi, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 0 days.

(21) Appl. No.: 17/716,314

(22) Filed: Apr. 8, 2022

(65) Prior Publication Data

US 2022/0332282 A1    Oct. 20, 2022

(30) Foreign Application Priority Data

Apr. 16, 2021  (JP) ................. 2021-069796

(51) Int. Cl.
*H01H 19/18* (2006.01)
*B60R 22/48* (2006.01)
*H01H 15/14* (2006.01)

(52) U.S. Cl.
CPC ............ *B60R 22/48* (2013.01); *H01H 15/14* (2013.01); *H01H 19/18* (2013.01); *B60R 2022/4816* (2013.01); *H01H 2207/004* (2013.01)

(58) Field of Classification Search
None
See application file for complete search history.

(56) References Cited

U.S. PATENT DOCUMENTS

| 4,798,970 | A | * | 1/1989 | Okamoto | H05B 6/6435 |
| | | | | | 219/703 |
| 5,831,229 | A | * | 11/1998 | Chou | H01H 13/18 |
| | | | | | 200/16 R |
| 6,864,440 | B2 | * | 3/2005 | Kim | H01H 19/63 |
| | | | | | 200/11 R |
| 7,262,373 | B2 | * | 8/2007 | Miura | H01H 25/008 |
| | | | | | 200/14 |
| 2021/0323500 | A1 | * | 10/2021 | Desaki | B60R 22/18 |

FOREIGN PATENT DOCUMENTS

JP          2016-159723 A      9/2016

* cited by examiner

*Primary Examiner* — Felix O Figueroa
(74) *Attorney, Agent, or Firm* — Greenblum & Bernstein, P.L.C.

(57) ABSTRACT

A seat belt attachment/detachment detection switch including a printed circuit board including a circuit for detecting attachment/detachment of a seat belt; a movable plate configured to slidably move along with insertion of a tongue plate of the seat belt; a rotor including a lever coupled to the movable plate, the rotor being rotatably attached to the printed circuit board to rotate as the tongue plate is pushed into a buckle; and an electric brush attached to the surface of the rotor that faces the printed circuit board, the electric brush having leg parts that change a state of contact/non-contact with a conductive part of the circuit in accordance with a rotating state of the rotor.

8 Claims, 6 Drawing Sheets

SEAT BELT ATTACHMENT/DETACHMENT DETECTION SWITCH

TECHNICAL FIELD

The present invention relates to a seat belt attachment/detachment detection switch.

BACKGROUND ART

For example, there is Patent Literature 1 (see Japanese Patent Application Laid Open No. 2016-159723, hereinafter referred to as Patent Literature 1) as related art of seat belt buckle switches.

The seat belt buckle switch in Patent Literature 1 includes a substrate that is placed inside a buckle, an electrode region formed on the substrate, a slider attached to the substrate so as to be slidable on the substrate, the slider being configured to slide in conjunction with attaching and detaching operation of a tongue plate, a movable terminal having one or more conductive leg parts extending in a sliding direction of the slider to come into contact with the substrate or the electrode region so as to be in the state of contact or non-contact with the electrode region when the slider slides on the substrate, and a guide part configured from one or more step parts provided on the substrate, the step parts extending continuously or intermittently along at least part of the electrode region to guide the movable terminal during sliding of the slider.

Since an operation direction of the seatbelt buckle switch in Patent Literature 1 is the same as an operation direction of the tongue plate, there is an issue that it is required to use a switch having the same operation range as a movable range of the tongue plate, which causes the switch to become larger.

SUMMARY OF THE INVENTION

Accordingly, an object of the present invention is to provide a small-size seat belt attachment/detachment detection switch.

A seat belt attachment/detachment detection switch of the present invention comprises a printed circuit board, a movable plate, a rotor, and an electric brush.

The printed circuit board includes a circuit for detecting attachment/detachment of a seat belt. The movable plate is configured to slidably move along with insertion of a tongue plate of the seat belt. The rotor includes a lever coupled to the movable plate, the rotor being rotatably attached to the printed circuit board to rotate as the tongue plate is pushed into a buckle. The electric brush is attached to the surface of the rotor that faces the printed circuit board, the electric brush having leg parts that change a state of contact/non-contact with a conductive part of the circuit in accordance with a rotating state of the rotor.

Effects of the Invention

A small-size seat belt attachment/detachment detection switch can be provided.

DETAILED DESCRIPTION

Hereinafter, an embodiment of the present invention will be described in detail. Component parts having the same functions are designated by the same reference numbers to omit redundant description.

First Embodiment

Figure 1:
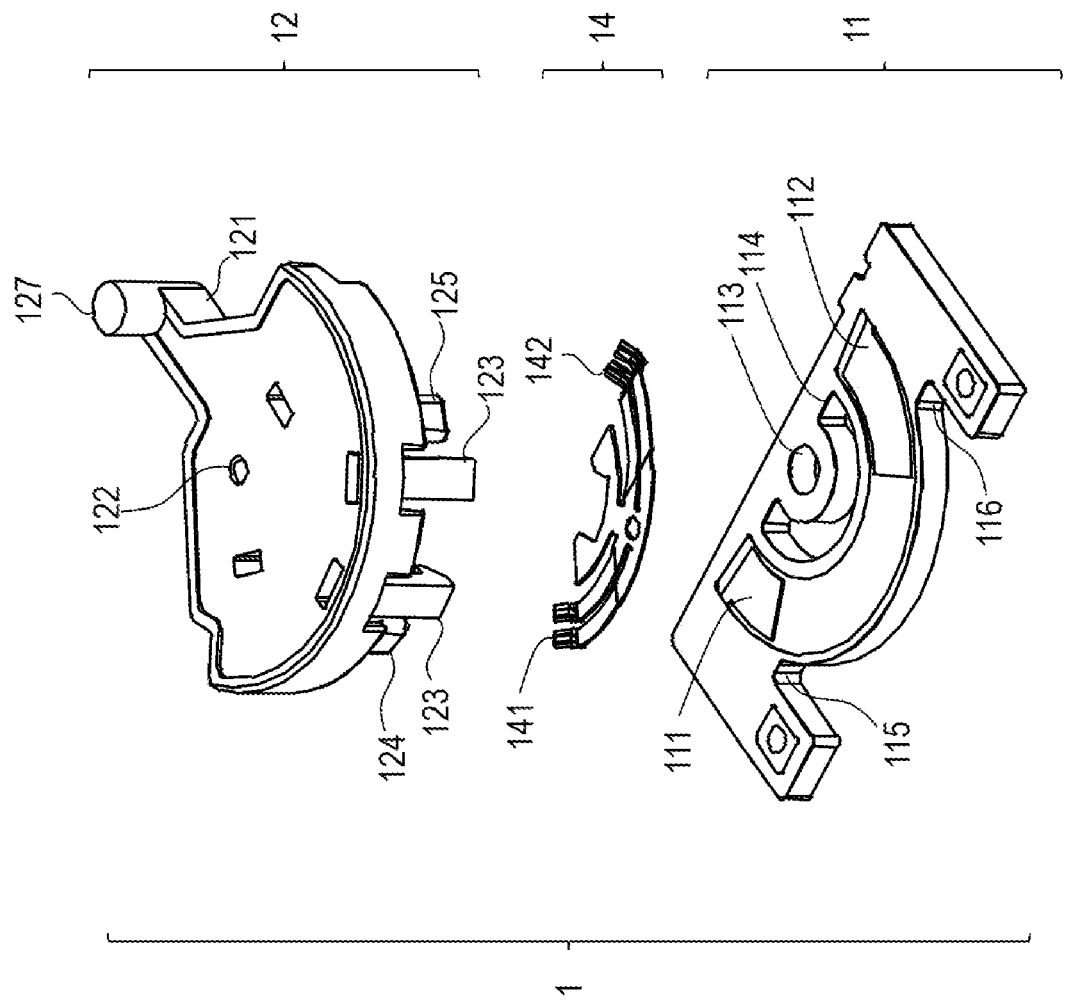
FIG. 1 is an exploded perspective view of a seat belt attachment/detachment detection switch.

Hereinafter, the configuration of a seat belt attachment/detachment detection switch of a first embodiment will be described with reference to FIG. 1. As shown in FIG. 1, a seat belt attachment/detachment detection switch 1 of the embodiment comprises a printed circuit board 11, a rotor 12, and an electric brush 14. The seat belt attachment/detachment detection switch 1 of the embodiment is coupled as a component part with a first movable plate and a second movable plate described later. However, the first movable plate and the second movable plate may be considered as the component parts of the seat belt attachment/detachment detection switch 1. A first movable plate 2 and a second movable plate 3 may be made of resin material. The first movable plate 2 and the second movable plate 3 are fixed to each other. The first movable plate 2 and the second movable plate 3 may also be integrally molded as one part.

The printed circuit board 11 includes a first circuit 111, a second circuit 112, a hole 113, a slit 114, a first groove 115, and a second groove 116. The rotor 12 includes a lever 121, a shaft 122, claws 123, a first protrusion 124, a second protrusion 125, and a protrusion part 127. The electric brush 14 includes a first leg part 141 and a second leg part 142.

Figure 2:
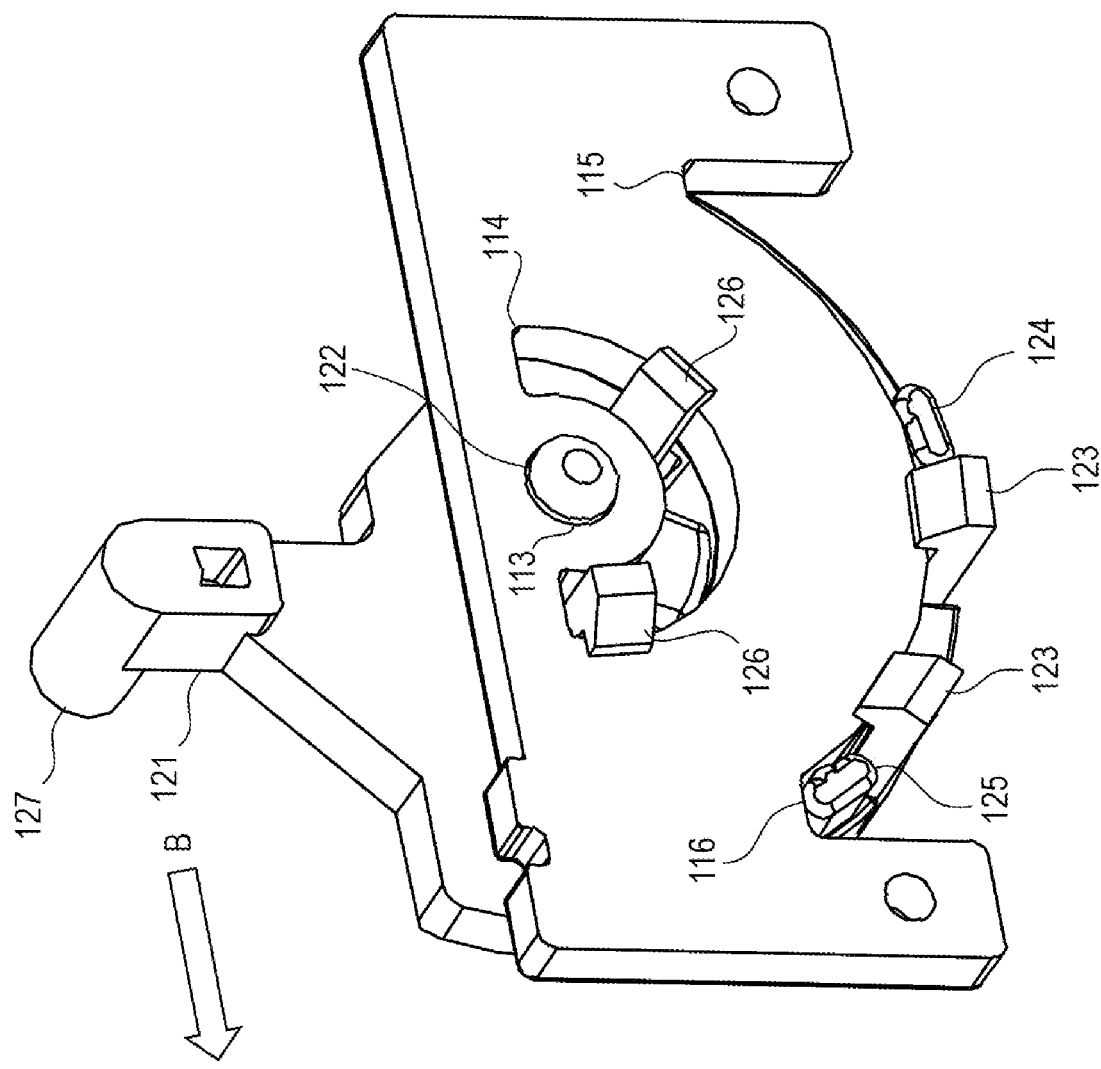
FIG. 2 is a perspective view of the seat belt attachment/detachment detection switch.

As shown in FIG. 2, the rotor 12 is rotatably attached to the printed circuit board 11. Specifically, the rotor 12 includes the shaft 122 extending toward the printed circuit board 11. The printed circuit board 11 includes the hole 113 fitted with the shaft 122. The rotor 12 is rotatable around the shaft 122 as a rotation axis.

The rotor 12 includes the lever 121 that protrudes in a direction perpendicular to the rotation direction of the rotor 12. The rotor 12 includes the protrusion part 127 provided at the tip of the lever 121, the protrusion part 127 protruding in a direction away from the printed circuit board 11 and being inserted into a groove of the second movable plate on a seat belt buckle side. Thus, the lever 121 is coupled to the second movable plate (described later). The rotor 12 rotates in a forward direction (in the direction of a white hollow arrow B in FIG. 2) as the tongue plate is pushed into the buckle.

The rotor 12 includes claws 126 extending toward the printed circuit board 11 and bulging in a direction different from the extending direction (in a direction away from the center of rotation). The printed circuit board 11 includes the arc-shaped slit 114 that allows insertion of the claws 126. Since the tips of the claws 126 are bulged, the tips of the claws 126 engage with the slit 114, which prevents the rotor 12 from floating and falling off.

Similarly, the rotor 12 includes claws 123 extending toward the printed circuit board 11 and bulging in a direction different from the extending direction (in a direction closer to the center of rotation). The tips of the claws 123 engage with a region of the printed circuit board 11 that is cut out in an arc shape, which prevents the rotor 12 from floating and falling off.

The rotor 12 also includes a first protrusion 124 that restricts rotation in the forward direction (rotation direction of the white hollow arrow B in FIG. 2), and a second protrusion 125 that restricts rotation in a reverse direction. The printed circuit board 11 includes the first groove 115 that is fitted with the first protrusion 124 when the rotor 12 is at a predetermined limit angle for the rotation in the forward direction, and the second groove 116 that is fitted with the second protrusion 125 when the rotor 12 is at a predetermined limit angle for the rotation in the reverse direction. A space between the first groove 115 and the second groove 116 is cut out in an arc shape.

Figure 3:
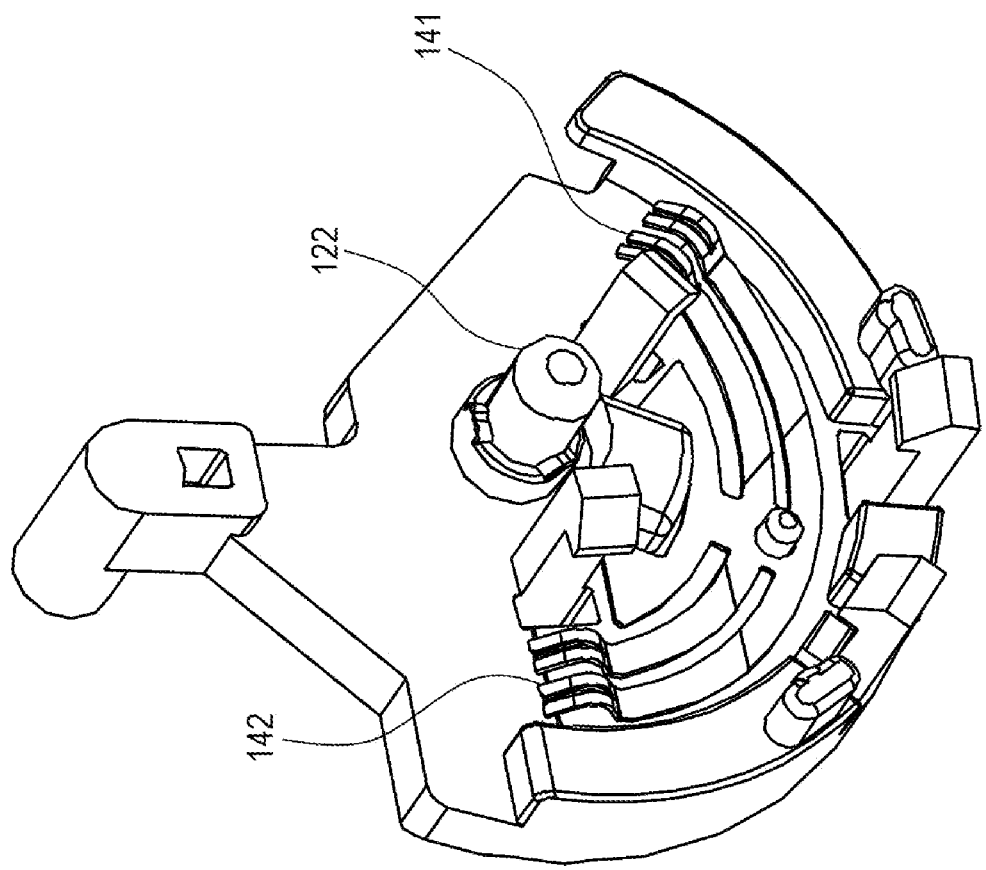
FIG. 3 is a perspective view of the seat belt attachment/detachment detection switch without a printed circuit board.

As shown in FIG. 3, the electric brush 14 is attached to the surface of the rotor 12 that faces the printed circuit board. The electric brush 14 includes a first leg part 141 that changes the state of contact/non-contact with a conductive part of the first circuit 111 on the printed circuit board 11 in accordance with the rotation state of the rotor 12, and a second leg part 142 that changes the state of contact/non-contact with a conductive part of the second circuit 112 on the printed circuit board 11 in accordance with the rotation state of the rotor 12. The first circuit 111 and the second circuit 112 are circuits for detecting attachment/detachment of the seat belt.

Figure 4:
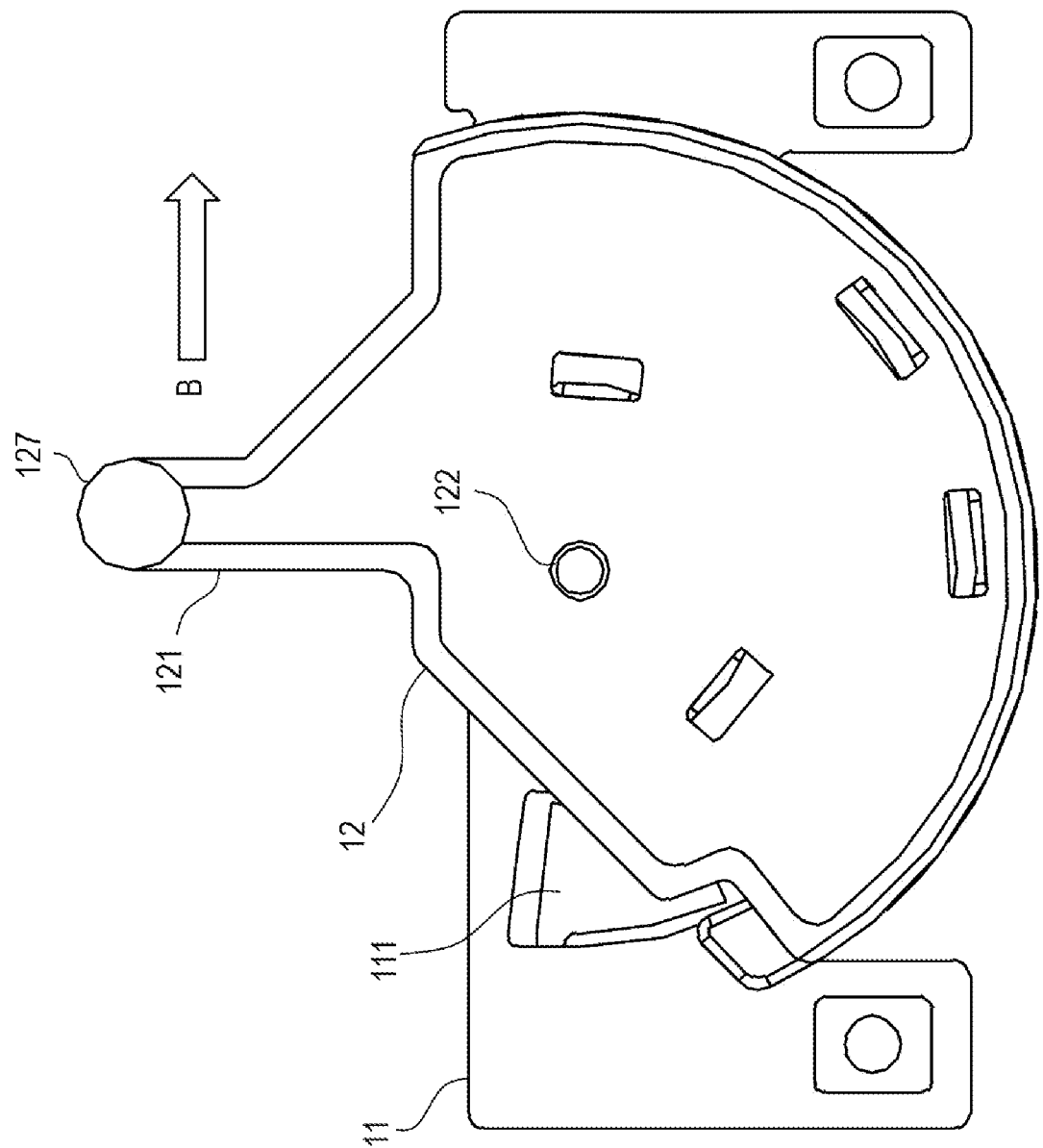
FIG. 4 is a plan view of the seat belt attachment/detachment detection switch in an initial state.
Figure 5:
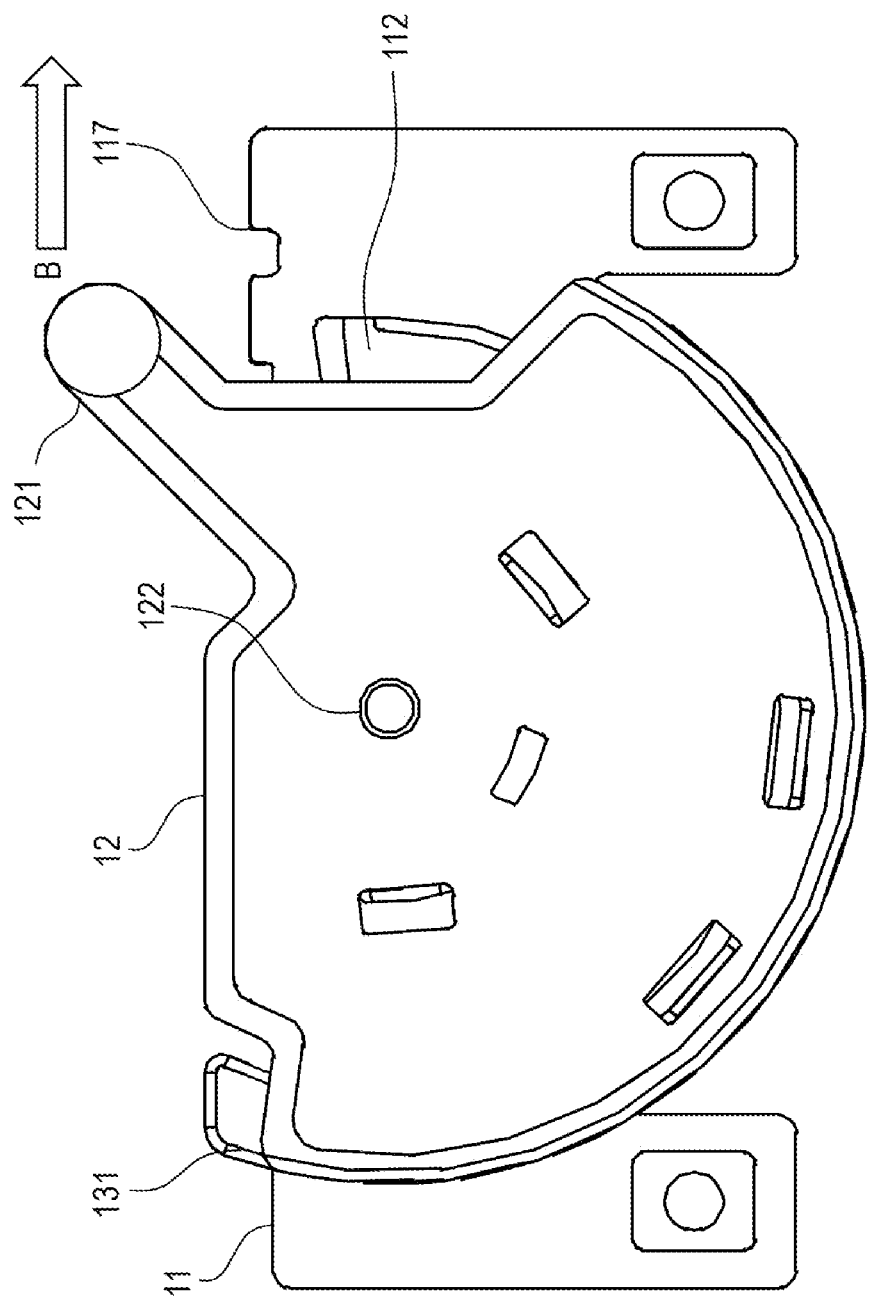
FIG. 5 is a plan view of the seat belt attachment/detachment detection switch in the state of being rotated in a forward direction.

FIG. 4 shows the orientation of the rotor 12 in an initial state, and FIG. 5 shows the orientation of the rotor 12 in the state of being fully rotated in the forward direction.

Figure 6:
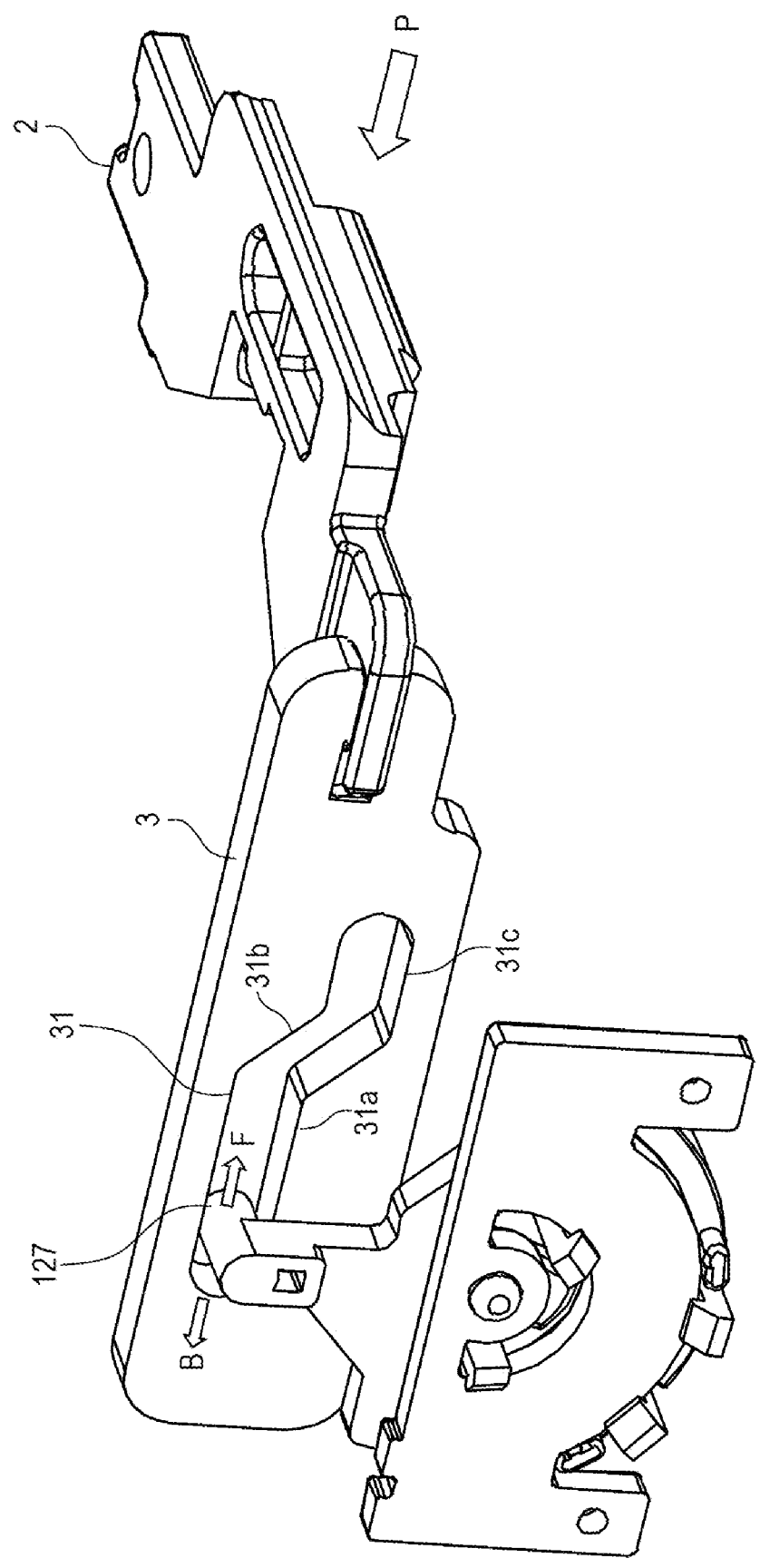
FIG. 6 is a perspective view showing the seat belt attachment/detachment detection switch in the state of being coupled with first and second movable plates.

As shown in FIG. 6, the seat belt attachment/detachment detection switch 1 in the embodiment is coupled with the first movable plate 2 and the second movable plate 3. As described above, the first movable plate 2 and the second movable plate 3 may be formed as a single part. As the tongue plate is inserted, the first movable plate 2 and second movable plate 3 slide in the direction of an arrow P in FIG. 6 by receiving force from the same arrow P direction. The second movable plate 3 includes a groove 31, and the groove 31 allows insertion of the protrusion part 127. The groove 31 has a stepped shape made up of a first linear part 31a, an inclination part 31b, and a second linear part 31c. The first linear part 31a extends in a tongue plate extracting direction. The inclination part 31b is adjacent to the first linear part 31a, and positioned more in the tongue plate extracting direction than the first linear part 31a. The inclination part 31b extends in the tongue plate extracting direction with an inclination at an angle θ (provided that θ<90°) based on the extending direction of the first linear part 31a. The second linear part 31c is adjacent to the inclination part 31b and positioned more in the tongue plate extracting direction than the inclination part 31b. The second linear part 31c extends in the direction parallel to the extending direction of the first linear part 31a.

As the tongue plate is inserted, the second movable plate 3 slides in the arrow P direction in FIG. 6. With the sliding, the protrusion part 127 moves inside the groove 31 and passes through the inclination part 31b. At the time, the protrusion part 127 comes into contact with an edge of the inclination part 31b present in the tongue plate extracting direction, so that the protrusion part 127 rotates in the direction of the white hollow arrow B by receiving force in the same arrow direction (state in FIG. 5). The protrusion part 127 passes through the inclination part 31b in this state, and moves inside the second linear part 31c. While the tang plate is inserted, the rotor 12 is in the state of rotation as shown in FIG. 5.

Next, as the tongue plate is extracted, the second movable plate 3 slides in the direction opposite to the white hollow arrow P direction in FIG. 6. Hence, the protrusion part 127 moves inside the second linear part 31c and passes through the inclination part 31b again. At the time, the protrusion part 127 comes into contact with an edge of the inclination part 31b present in a tongue plate pushing-in direction, so that the protrusion part 127 rotates in the direction of the white hollow arrow F by receiving force in the same arrow direction (state in FIG. 4). The protrusion part 127 passes through the inclination part 31b in this state, and moves inside the first linear part 31a. When the tang plate is extracted, the rotor 12 is in the state shown in FIG. 4.

The seat belt attachment/detachment detection switch 1 of the embodiment can be downsized by changing the slider, which is conventionally slid in a single axis direction in conjunction with insertion and extraction of the tongue plate of the seat belt into/from the buckle, to the rotor 12 that rotates. The claws 123 and 126 provided in the rotor 12 can prevent the rotor 12 from floating and falling from the printed circuit board 11. Moreover, since the first protrusion 124 and the second protrusion 125 are provided in the rotor 12, and the first groove 115 and the second groove 116 are provided so as to be fitted with the first protrusion 124 and the second protrusion 125, it is possible to rotate the rotor 12 within a predetermined angle range.

The second movable plate 3 has the stepped groove 31 provided to allow insertion of the protrusion part 127 of the rotor 12. With attachment/detachment of the tongue plate, the protrusion part 127 moves inside the inclination part 31b, which causes the rotor 12 and the electric brush 14 to rotate. As a result, the state of contact/non-contact with the first circuit 111 and the second circuit 112 is changed, which makes it possible to correctly detect the attachment/detachment of the tongue plate.

What is claimed is:

1. A seat belt attachment/detachment detection switch, comprising:
   a printed circuit board including a circuit for detecting attachment/detachment of a seat belt;
   a movable plate configured to slidably move along with insertion of a tongue plate of the seat belt;
   a rotor including a lever coupled to the movable plate, the rotor being rotatably attached to the printed circuit board to rotate as the tongue plate is pushed into a buckle;
   an electric brush attached to a surface of the rotor that faces the printed circuit board, the electric brush having leg parts that change a state of contact/non-contact with a conductive part of the circuit in accordance with a rotating state of the rotor;
   a protrusion provided at a tip of the lever, the protrusion protruding in a direction away from the printed circuit board and being inserted into a groove provided on the movable plate, wherein
   the groove includes
   a first linear part extending in a tongue plate extracting direction, and
   an inclination part positioned more in a tongue plate extracting direction than the first linear part and extending in the tongue plate extracting direction with an inclination at an angle θ, provided that θ<90°, based on the extending direction of the first linear part, and a second linear part positioned more in the tongue plate extracting direction than the inclination part and extending in parallel to the extending direction of the first linear part.

2. The seat belt attachment/detachment detection switch according to claim 1, wherein
the rotor includes a shaft extending toward the printed circuit board, and
the printed circuit board includes a hole fitted with the shaft.

3. The seat belt attachment/detachment detection switch according to claim 1, wherein
the rotor includes claws extending toward the printed circuit board and bulging in a direction different from the extending direction, and
the printed circuit board includes an arc-shaped slit that allows insertion of the claws.

4. The seat belt attachment/detachment detection switch according to claim 2, wherein
the rotor includes claws extending toward the printed circuit board and bulging in a direction different from the extending direction, and
the printed circuit board includes an arc-shaped slit that allows insertion of the claws.

5. The seat belt attachment/detachment detection switch according to claim 1, wherein
the rotor includes a first protrusion that restricts rotation in a forward direction, and a second protrusion that restricts rotation in a reverse direction, and
the printed circuit board includes a first groove that is fitted with the first protrusion when the rotor is at a predetermined limit angle for the rotation in the forward direction, and a second groove that is fitted with the second protrusion when the rotor is at a predetermined limit angle for the rotation in the reverse direction.

6. The seat belt attachment/detachment detection switch according to claim 2, wherein
the rotor includes a first protrusion that restricts rotation in a forward direction, and a second protrusion that restricts rotation in a reverse direction, and
the printed circuit board includes a first groove that is fitted with the first protrusion when the rotor is at a predetermined limit angle for the rotation in the forward direction, and a second groove that is fitted with the second protrusion when the rotor is at a predetermined limit angle for the rotation in the reverse direction.

7. The seat belt attachment/detachment detection switch according to claim 3, wherein
the rotor includes a first protrusion that restricts rotation in a forward direction, and a second protrusion that restricts rotation in a reverse direction, and
the printed circuit board includes a first groove that is fitted with the first protrusion when the rotor is at a predetermined limit angle for the rotation in the forward direction, and a second groove that is fitted with the second protrusion when the rotor is at a predetermined limit angle for the rotation in the reverse direction.

8. The seat belt attachment/detachment detection switch according to claim 4, wherein
the rotor includes a first protrusion that restricts rotation in a forward direction, and a second protrusion that restricts rotation in a reverse direction, and
the printed circuit board includes a first groove that is fitted with the first protrusion when the rotor is at a predetermined limit angle for the rotation in the forward direction, and a second groove that is fitted with the second protrusion when the rotor is at a predetermined limit angle for the rotation in the reverse direction.

* * * * *